United States Patent [19]

Petta

[11] Patent Number: 5,388,318
[45] Date of Patent: Feb. 14, 1995

[54] METHOD FOR DEFINING A TEMPLATE FOR ASSEMBLING A STRUCTURE

[75] Inventor: Gabriel Petta, Woodbridge, Canada

[73] Assignee: Laharco, Inc., Portland, Oreg.

[21] Appl. No.: 959,245

[22] Filed: Oct. 9, 1992

[51] Int. Cl.⁶ .......................................... H05K 13/00
[52] U.S. Cl. ................................. 29/407; 29/897.31;
33/228; 250/235; 358/474
[58] Field of Search ................. 29/897, 897.3, 897.31,
29/897.312, 407; 33/228, DIG. 21; 353/28;
364/468; 358/199, 225, 226, 227, 474; 250/235

[56] References Cited

U.S. PATENT DOCUMENTS

| | | | |
|---|---|---|---|
| 3,304,834 | 2/1967 | Ollfisch et al. | 88/24 |
| 3,603,581 | 9/1971 | Christal | 269/307 |
| 3,986,007 | 10/1976 | Ruoff, Jr. | 29/407 X |
| 4,102,568 | 7/1978 | Miyagi | 353/28 |
| 4,367,021 | 1/1983 | Nordgren et al. | 353/121 |
| 4,514,899 | 5/1985 | Burger | 29/721 |
| 4,569,024 | 2/1986 | Reichert et al. | 364/475 |
| 4,580,345 | 4/1986 | Andrew | 33/21.3 |
| 4,739,487 | 4/1988 | Bonnet et al. | 364/475 |
| 4,941,183 | 7/1990 | Bruder et al. | 382/8 |
| 4,971,413 | 11/1990 | Inoue | 350/6.8 |
| 5,046,015 | 9/1991 | Dasher et al. | 364/474 |
| 5,148,591 | 9/1992 | Pryor | 29/407 |
| 5,258,917 | 11/1993 | Bruder et al. | 364/474 |

OTHER PUBLICATIONS

*ILDM Series Industrial Laser Display Module,* General Scanning, Inc., GSI 302080.

*Primary Examiner*—Timothy V. Eley
*Attorney, Agent, or Firm*—Marger, Johnson, McCollom & Stolowitz

[57] ABSTRACT

A method and apparatus for generating a template for use in assembling a structure such as a truss. One or more laser scanners mounted above a work surface are controlled by a computer to generate a scanning laser image of all or a portion of the structure. The computer receives data describing the relative location of the individual work pieces in their assembled positions and the position of the laser scanner relative to the work surface. The computer generates a set of template defining data which is converted to a control signal and transmitted to the laser scanner.

7 Claims, 2 Drawing Sheets

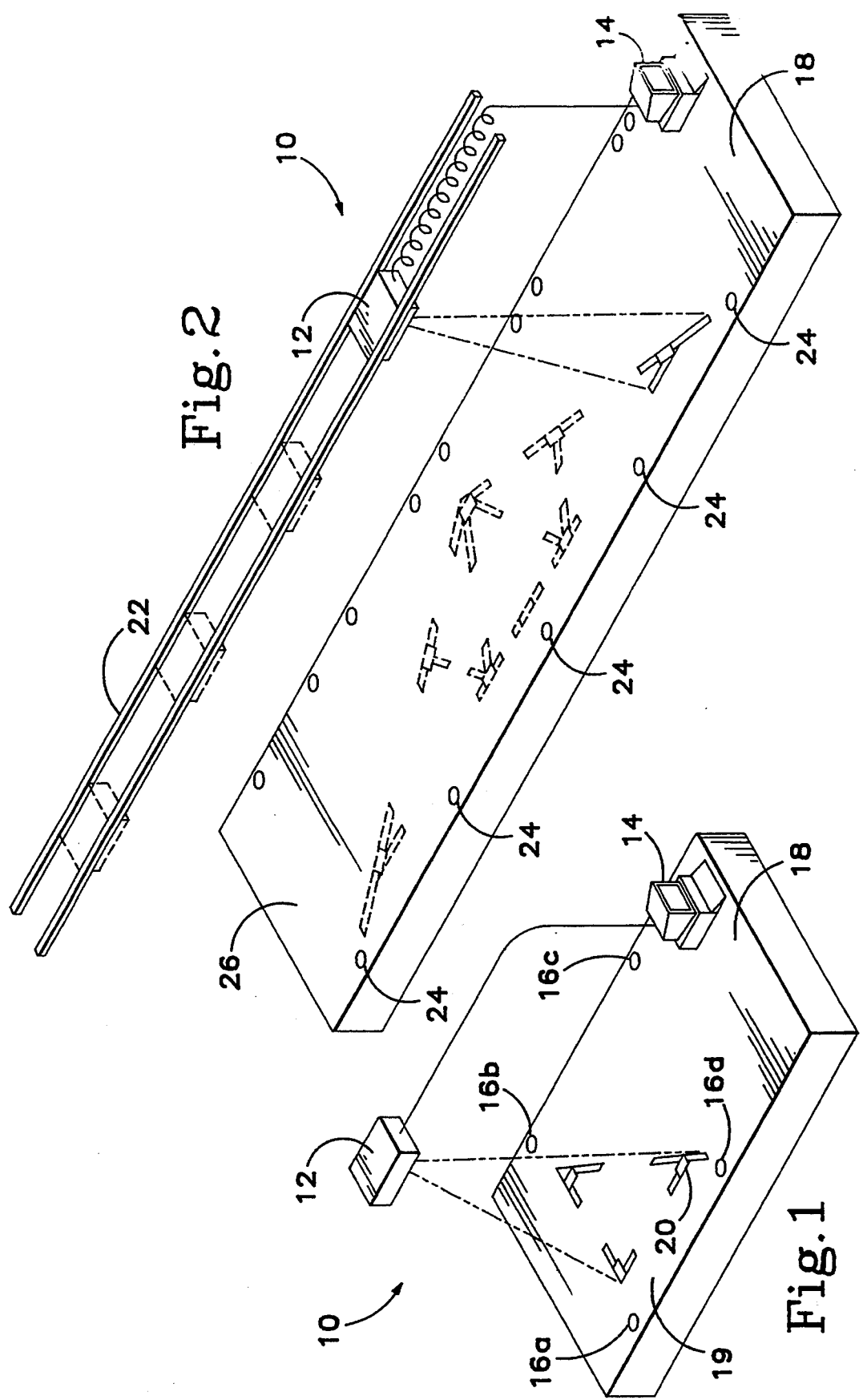

5,388,318

METHOD FOR DEFINING A TEMPLATE FOR ASSEMBLING A STRUCTURE

BACKGROUND OF THE INVENTION

1. Field of the Invention

The present invention relates generally to a method and apparatus for generating a template for use in assembling a structure such as a truss.

2. Related Art

Trusses and other large frame-like assemblies are normally assembled according to a template defined on a horizontal work surface. The usual method for fabricating a truss includes the steps of manufacturing the individual truss members required, positioning the truss members on a work surface where indicated by the template, and then joining the truss members together to form the truss. A key step in this process is the generation of a full-size template of the truss on the work surface according to which the individual truss members are positioned for assembly.

Known methods of generating a template include manually "drawing" the truss or portions thereof on the work surface. Alternatively, U.S. Pat. No. 4,514,899 discloses a method of assembling a wooden structure which includes forming an image of the structure on a transparency, superimposing an image of a rectilinear grid on the transparency over the image of the structure, and projecting the combined image of the structure and grid onto a movable assembly table, on which a reference grid is mapped. Alignment of the template on the work surface is achieved by alignment of the projected grid with the reference grid.

U.S. Pat. No. 4,739,487 discloses a method and apparatus for generating a template for use in the garment industry which includes storage of the coordinates of a plurality of patterns of garments or pieces thereof, displaying an image of a selected pattern onto a cutting table by means of a suitable video projection means, selecting the ideal position of the projected image on the cutting table, storing the optimal positioning data, and sending a command to cut the material from a sheet of material on the table.

There have also been attempts to improve methods of locating jigging hardware on a work surface. One such method used x-y data stored in a computer to repeatedly and sequentially direct a laser onto a series of single points on the work surface, at which points a worker marks the worksurface for later placement of jigging hardware. Also known are mechanical systems which moved and positioned locating pins around the worksurface.

Known methods of generating a full-size template for use in assembling relatively large structures such as a truss are problematic in that they require inordinate amounts of time and labor to produce. Moreover, known methods may require physical measurements over relatively large distances, which are difficult to perform with sufficient accuracy to achieve the design tolerances and strength of the structure. Methods known for generating smaller templates, optical projection methods for example, are not suitable for generating templates of larger structures due to the loss of resolution and distortion which result from the typically high enlargement ratio required to generate a full-size template.

SUMMARY OF THE INVENTION

The present invention addresses the problems of quickly and economically generating an accurate template of a large structure such as a truss by providing a method and apparatus for generating large scale templates. The method of the present invention includes the steps of generating data representative of the size, relative location, and points of attachment of each of the work pieces in an assembled structure, using the data to generate a control signal, using the control signal to generate a scanning laser image of the assembled structure, and projecting the scanning laser image onto a working surface. The data may be gathered from the files of a computer aided design system. The method may further comprises the steps of laying each of the work pieces on the working surface in alignment with a portion of the projected image, and attaching the work pieces to one another. The scanning laser image may be generated by a projector and the method may further comprise the step of determining the location of the projector relative to a predetermined location on the working surface.

The control signal may be generated by a processor and the step of determining the location of the projector relative to a predetermined location on the working surface may comprise the steps of projecting a laser beam onto a sensor mounted on the working surface at a predetermined location and transmitting a projector position signal from said sensor to said processor responsive to the step of projecting the laser beam onto the sensor.

In the method of the present invention, the projector may be movable relative to the working surface, and the method may further include the step of using the control signal to generate a scanning laser image of a selected portion of the assembled structure. Scanning laser images of adjoining portions of the assembled structure may be generated sequentially by the movable projector, and include the step of assembling portions of the structure in sequence as their respective images are generated responsive to the control signal.

An apparatus for generating a template for use in assembling a structure from a plurality of work pieces according to the present invention comprises means for generating data representative of the size, relative location, and points of attachment of each of the work pieces in an assembled structure, a processor for receiving such data, said processor being operable to generate a control signal, a projector for projecting a scanning laser image of the assembled structure responsive to said control signal, and a working surface upon which said image is projected. The projector may be movable relative to said working surface. The apparatus may also include a plurality of projectors.

The apparatus may further include means for projecting a scanning laser image of only a selected portion of the assembled structure, or of the entire assembled structure. The means for projecting a scanning laser image of the entire structure may include means for projecting a composite image, and may include a plurality of projectors which are controllable for simultaneously projecting a composite scanning laser image of the assembled structure responsive to the control signal.

The apparatus may further include means for determining the location of the projector relative to a predetermined location on the working surface. The means for determining the location of the projector relative to a predetermined location on the working surface may comprise a sensor mounted on the surface and which is operable to generate a signal when a laser beam is projected upon the sensor, and means for operably connecting said sensor to said processor.

The method and apparatus of the present invention are best understood by reference to the drawings and the detailed description of the preferred embodiments.

BRIEF DESCRIPTION OF THE DRAWINGS

FIG. 1 is a schematic perspective view of a first embodiment of the present invention which comprises a single fixed laser scanner head for defining a template on the work surface.

FIG. 2 is a schematic perspective view of a second embodiment of the present invention which comprises a single laser scanner head which is movable along the length of the work surface.

DETAILED DESCRIPTION OF THE DRAWINGS

Figure 3:
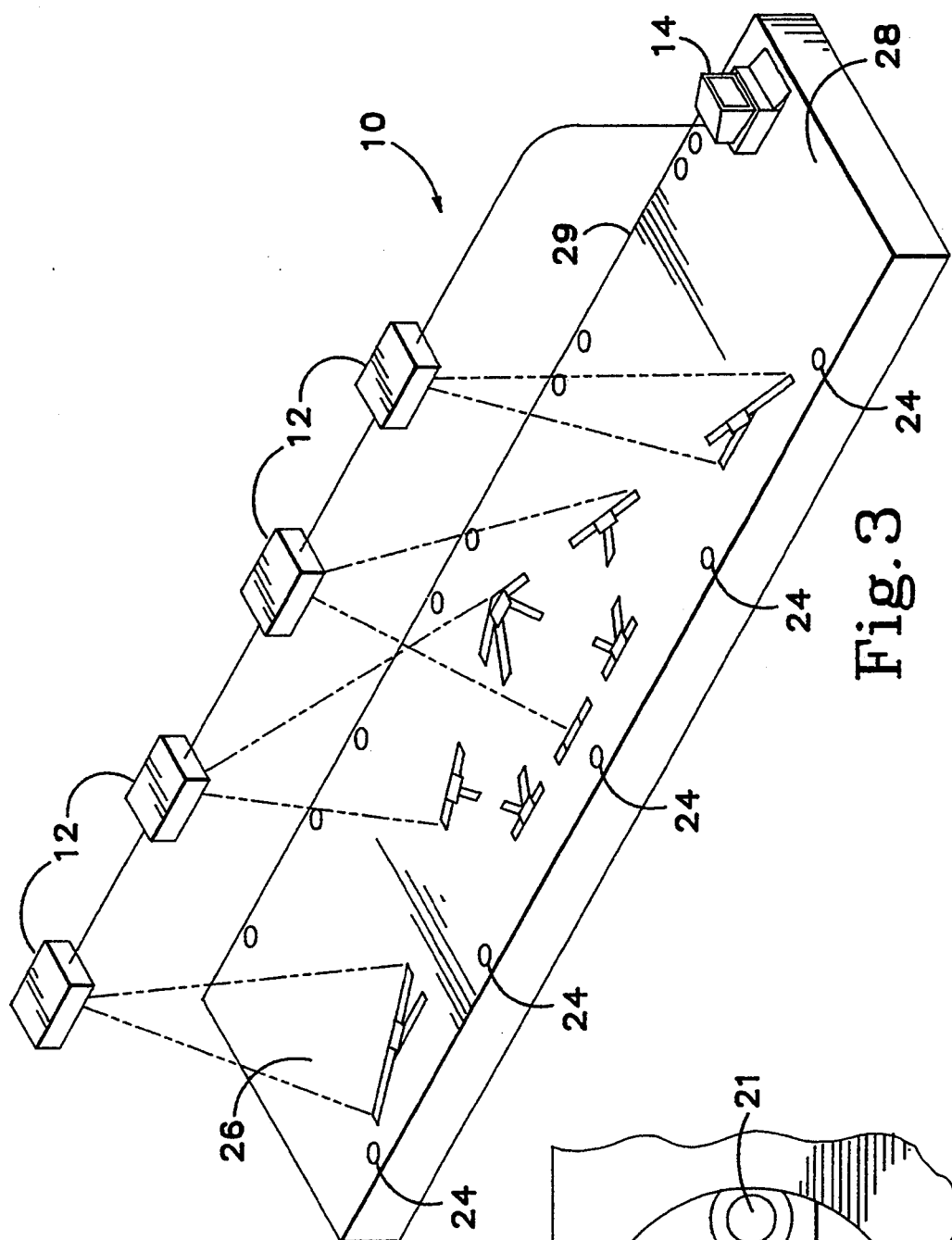
FIG. 3 is a schematic perspective view of a third embodiment of the present invention which comprises multiple fixed laser scanner heads which cooperatively define a template.

Referring now to the drawings, the present invention will be described in greater detail by description of three embodiments. Turning to FIG. 1, a system for generating a template in the form of scanning laser image according to the first embodiment of the present invention is shown generally at 10. System 10 includes a single laser scanner 12 in a fixed position above work surface 18, a central computer 14, and four sensors 16a–16d embedded in work surface in a generally rectangular pattern. Work surface 18 is preferably a layout table of conventional design, and which may be construed of plywood, plactic, or other suitable material. Work surface 18 includes a number of sections having vertical slots in which stops can be engaged for positioning truss members. Those skilled in the art will appreciate that methods other than slots may by used to position and affix template stops on the worksurface.

In the preferred embodiment, system 10 is designed to readily interface with a conventional computer aided design (CAD) system (not shown) on which the truss was designed. The CAD system typically includes a file in which is stored the design data for the truss, including the endpoints of each truss member in X-Y coordinates, the location of plates for connecting the truss members and loading information. Central computer 14, preferably an IBM-compatible computer, is programmed to receive instructions from a user selecting a truss to be assembled. In response to the selection of a truss by the user, computer 14 accesses a data storage file of the CAD system and selects and imports the X-Y coordinate data for each truss member into a file in computer 14. In the preferred embodiment, the selection and importation of the X-Y coordinate data for the truss members is accomplished by use of a utility program which uses well-known programming techniques to identify and extract the required X-Y data from the CAD system storage file. Alternatively, the truss member X-Y coordinate data may be imported by computer 14 from any suitable data communication or storage means.

Using the imported data, and adding coordinates by interpolation, computer 14 calculates the additional data necessary to define a template consisting of a partial image of the truss. In the preferred embodiment, the partial truss image making up the template includes the lower edge of the truss in the vicinity of the joints, the top center point of the truss, and an outline of each of the joints connecting the component truss members. The images of the individual truss members are truncated a short distance from each joint so that only the joints are displayed. As will be recognized by those skilled in the art, certain of these defining and orienting parameters such as the top center point are arbitrary, and alternative combinations of defining and orienting parameters could be selected and employed to position the template on the work surface with equally satisfactory results, and without departing from the scope of the invention.

Figure 4:
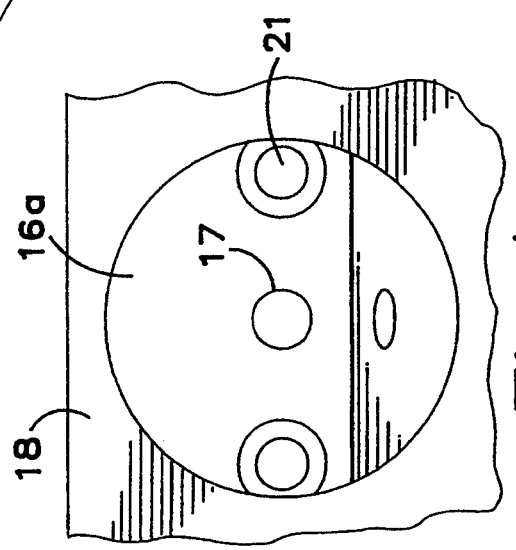
FIG. 4 is a schematic view of a sensor used as a positional sensor and as a template field identifying sensor.

Having selected and calculated the data required to generate the template as described, the user may then signal computer 14 to display the image of the template within a template field on a monitor. The user may rotate or translate the template within the template field as desired to select a preferred location and orientation. Computer 14 then determines the location of scanning laser 12 with respect to the work surface 18 in the following manner. A control signal is sent to laser scanner 12 locate four position indicating sensors 16a–16d (FIG. 4) embedded in work surface 18, and which together define the corners of a template field 19. Position sensors 16a–16d include a photo transistor 17 mounted in a black nylon puck, which in turn is embedded in work surface 18. The phototransistor is preferably one made according to industry standard TO-18. The nylon puck includes additional holes 21 as required to mount the puck to the work surface, and to pass the required photo transistor lead wires through the puck for connection to computer 14. In response to sensing the scanning laser, each position indicating sensor 16a 16d sends a signal to computer 14 from which computer 14 determines the position of laser scanner 12 relative to the work surface 18. The control signal from computer 14 causes the laser to scan a predetermined area until each sensor is located. If a position sensor is not located in the scanned area, computer 14 is programmed to wait a short period of time for the scanner to be repositioned by the operator within scanning range of the sensor, and then to rescan for the position sensor.

Having determined the location of laser scanner 12 relative to work surface 18, and having selected and calculated the data required for generating the template in the desired location and orientation, central computer 14 generates and transmits a series of control signals to laser scanner 12. Laser scanner 12 is a closed loop galvanometer laser scanner, Model ILDM manufactured by General Scanning of Waterton, Mass. The scanner includes a device for generating a focused laser beam, a scanner driver box, X-Y galvanometric scanner heads which rotate mirrors to guide the focused laser beam onto work surface 18, and a processor for receiving control signals from computer 14 and positional data from the galvanometers in the scanner heads.

In the first embodiment, laser scanner 12 is preferably mounted about 13 feet 6 inches above work surface 18, and is positioned 1 foot 9 inches beyond one edge of work surface 18 to allow for delivery of truss members and the removal of the finished truss from overhead. In response to the control signals from computer 14, laser scanner 12 generates a scanning laser image of the template on work surface 18 in the selected position and orientation, as well as the plate connectors required to connect the truss members. Alternatively, the location of the plate connectors may be displayed separately by the laser scanner to facilitate the placement of the plates prior to positioning the truss members on the worksurface. The template 20 is preferably oriented so that the bottom edge of the truss is positioned against a raised lip near a lateral edge of the template field 19, and the top center point is centered in template field 19. The truss is then assembled by positioning the truss members with their ends within the outlines of the truss member joints according to the template, and interconnecting them. As will be appreciated by one skilled in the art, the truss members may be interconnected by plate connectors which have been positioned beneath the truss members according to the template prior to positioning the truss members on the work surface. As the truss is being assembled, computer 14 periodically checks the position and orientation of the template, and corrects for thermal expansion and contraction of the work surface, by checking the location of laser scanner 12 with respect to sensors 16a–16d as described above. Five second intervals have proven satisfactory, although alternative intervals may be selected by the user as desired.

The first embodiment employing a fixed single laser scanner as just described may be used to generate a template as large as approximately 12 feet by 10 feet. In the event a larger truss must be assembled, the required template may be generated by a second embodiment of the present invention as depicted in FIG. 2. The second embodiment also includes a computer 14, a work surface 18, and a single laser scanner 12. Rather than being mounted in a fixed position above work surface 18, however, laser scanner 12 is mounted on track 22, and is movable along the length of work surface 18 in response to control signals from computer 14. Rather than displaying a single template of the entire truss, the second embodiment divides the template of the entire truss into a series of adjoining partial templates, each representing adjoining sections of the truss. The partial templates are then sequentially generated on the work surface, normally starting at one end of the truss and working toward the opposite end. After the truss members for a displayed truss portion are assembled, a user signals computer 14 to display the template of the adjoining truss section, which is then assembled. The process is repeated until the entire truss is completed.

The template of each truss section is generated according to the same principles as previously described, with the following modifications. Computer 14 is programmed to divide the template of the whole truss into partial templates, and to generate a series of partial templates displaying each truss section rather than a single template of the entire truss. Each partial template is sized to be displayed within a single template field. In order to accommodate this, computer 14 distinguishes among the template fields 26 by scanning to locate the position sensors for each field to identify the adjacent fields. Computer 14 is then able to control laser scanner 12 to display each partial template in its proper template field. While allowing a larger truss to be assembled, and offering a measure of economy by employing a single laser scanner, the second embodiment requires the different sections of a larger truss to be assembled sequentially rather than allowing for the simultaneous display and assembly of all the truss sections.

A third embodiment of the present invention takes advantage of multiple laser scanners to allow the simultaneous display and assembly all the truss sections. Turning to FIG. 3, the third embodiment includes four fixed laser scanners which are mounted above an elongated work surface 28, and are evenly spaced along one long edge 29. Work surface 28 and laser scanners 12 are otherwise as previously described. As described in the second embodiment, additional position sensors 24 are embedded in work surface 28, and serve to define multiple template fields 26, each of which also has an identifying sensor 28 located therein. Computer 14 is programmed to send control signals to any one of the four laser scanners individually, or to all of them simultaneously as chosen by the user. Therefore, as in the first embodiment, the third embodiment may be used to generate a complete template of a smaller truss within a single template field 26; it may also be used to sequentially generate templates of adjoining truss portions for use in assembling a larger truss as described in the second embodiment. Additionally, the third embodiment can simultaneously display all of the partial templates of a larger truss in adjacent template fields, allowing a complete template for the truss to be displayed as a composite of partial templates, allowing two or more of the truss sections to be assembled simultaneously.

While the present invention has been described in terms of three embodiments, those skilled in the art will recognize that numerous modifications in structure and detail may be made without departing from the scope and spirit of the invention, and all such modifications are hereby claimed.

I claim:

1. A method of providing a template for use in assembling a structure from a plurality of work pieces comprising the steps of:

generating data representative of the size, location, and points of attachment of each of the work pieces in an assembled structure;

using the data to generate a control signal;

using the control signal to generate a scanning laser image of the assembled structure;

projecting the scanning laser image onto a working surface;

using the projected image to align the work pieces; and attaching the work pieces to one another.

2. The method of claim 1 wherein said structure is a truss.

3. The method of claim 2 where said work pieces comprise truss members.

4. The method of claim 2 where said work pieces comprise plate connectors.

5. The method of claim 2 where said work pieces comprise truss members and plate connectors and wherein the step of using the projected image to align the work pieces comprises the steps of:

using the projected image to align the plate connectors; and using the projected image to align the truss members.

6. The method of claim 1 wherein the step of generating data comprises the step of using a conventional computer aided design system to generate the data.

7. The method of claim 1 wherein the step of attaching the work pieces to one another comprises the step of using plate connectors to interconnect the work pieces to each other.

* * * * *